United States Patent [19]

Bilgrien et al.

[11] Patent Number: 5,254,656

[45] Date of Patent: Oct. 19, 1993

[54] CURABLE ORGANOSILOXANE COMPOSITIONS CONTAINING ORGANOTITANATE/MICROENCAPSULATED PLATINUM CO-CATALYSTS

[75] Inventors: Carl J. Bilgrien, Midland; Beth A. Witucki, Bay City, both of Mich.

[73] Assignee: Dow Corning Corporation, Midland, Mich.

[21] Appl. No.: 937,020

[22] Filed: Aug. 31, 1992

[51] Int. Cl.$^5$ .............................................. C08G 77/06
[52] U.S. Cl. ....................................... 528/15; 528/17; 525/478
[58] Field of Search ...................... 528/15, 17; 525/478

[56] References Cited

U.S. PATENT DOCUMENTS

| | | | |
|---|---|---|---|
| 3,734,882 | 5/1973 | Talcott | 260/37 SB |
| 4,102,852 | 7/1978 | DeLaTorre et al. | 260/37 SB |
| 4,122,109 | 10/1978 | Halm | 260/448.2 S |
| 4,722,957 | 2/1988 | Braun et al. | 524/262 |

FOREIGN PATENT DOCUMENTS

| | | |
|---|---|---|
| 49-33950 | 3/1974 | Japan . |
| 1573022 | 6/1990 | U.S.S.R. . |
| 1538432 | 11/1976 | United Kingdom . |

*Primary Examiner*—Melvyn I. Marquis
*Attorney, Agent, or Firm*—Robert Spector

[57] ABSTRACT

The presence of both an organotitanium compound and a microencapsulated platinum-containing hydrosilation catalyst in organosiloxane compositions curable by a hydrosilation reaction not only increases the heat stability of elastomers prepared from the composition, but also unexpectedly increases the cure rate of the compositions. In addition to the platinum-containing and organotitanium co-catalysts the curable compositions comprise an organohydrogenpolysiloxane curing agent and a liquid or high consistency organopolysiloxane containing an average of at least two ethylenically unsaturated hydrocarbon radicals per molecule.

5 Claims, No Drawings

CURABLE ORGANOSILOXANE COMPOSITIONS CONTAINING ORGANOTITANATE/MICROENCAPSULATED PLATINUM CO-CATALYSTS

BACKGROUND OF THE INVENTION

1. Field of the Invention

This invention relates to curable organosiloxane compositions. More particularly, this invention relates to organosiloxane compositions that cure by a hydrosilation reaction and contain a novel combination of two curing catalysts. In addition to accelerating curing of the compositions one of the co-catalysts, an organotitanium compound, improves the resistance of cured articles prepared from the compositions to heat-induced degradation.

2. Background Information

The efficacy of organotitanium compounds as heat stabilizers for organosiloxane compositions is reported in the patent and journal literature. Addition of organotitanates or salts of these compounds to peroxide-curable organosiloxane compositions is reported in U.S. Pat. No. 3,734,882, which issued to T. Talcott on May 22, 1973; in Russian patent No. 1,573,022, which issued on Jun. 23, 1990; in Japanese Laid Open Application 49/33950, which was published on Mar. 28, 1974; and in British patent No. 1,538,432.

U.S. Pat. No. 4,102,852, which issued to Delatorre and Beers on Jul. 25, 1978 teaches adding platinum compounds as flame retarding agents to room temperature vulcanizable organosiloxane compositions comprising a silanol-terminated organopolysiloxane, a curing agent containing silicon-bonded alkoxy groups and a chelated organotitanium compound as the curing catalyst.

The preparation of certain reaction products of titanium-, hafnium- or zirconium compounds and liquid triorganosiloxy-terminated methylpolysiloxane fluids together with the use of these reaction products as heat transfer fluids or heat stabilizers for liquid methylpolysiloxanes is taught in U.S. Pat. No. 4,122,109, which issued to Halm on Oct. 24, 1978.

The use of the titanium-containing reaction products described in the Halm patent as heat stabilizers for a finely divided, particulate form of cured silicone rubber is disclosed in U.S. Pat. No. 4,722,957, which issued to J. Braun and S. Smith on Feb. 2, 1988. The silicone rubber is prepared by a platinum-catalyzed hydrosilation reaction involving a vinyl-substituted organopolysiloxane and an organohydrogenpolysiloxane. Preferred vinyl-substituted organopolysiloxane exhibit a viscosity of less than 5 pascal seconds at 25° C. and contain diorganosiloxane, monoorganosilsesquioxane, and triorganosiloxane units.

A disadvantage of using the heat stabilizers described in the Halm patent in a curable organosiloxane composition of the type described in the Braun and Smith patent is the requirement for pre-reacting an organotitanium compound with a liquid dimethylpolysiloxane and adding the resultant reaction product to the curable organosiloxane composition.

SUMMARY OF THE INVENTION

The present inventors discovered that the presence of both an organotitanium compound and a microencapsulated platinum-containing hydrosilation catalyst in curable organosiloxane compositions not only increases the heat stability of elastomers prepared from the composition, but also unexpectedly increases the cure rate of the compositions. In addition to the platinum and organotitanium compounds the curable compositions comprise an organohydrogenpolysiloxane as the curing agent and a polyorganosiloxane containing an average of at least two ethylenically unsaturated hydrocarbon radicals per molecule.

DETAILED DESCRIPTION OF THE INVENTION

This invention provides an improved curable organosiloxane composition comprising A) an organopolysiloxane containing an average of at least two terminally unsaturated hydrocarbon radicals per molecule, B) an amount of an organohydrogenpolysiloxane sufficient to cure said organopolysiloxane to an elastomer in the presence of a hydrosilation catalyst, and C) an amount of a microencapsulated platinum-containing hydrosilation catalyst sufficient to promote curing of said composition.

The improvement comprises the presence in said composition of

D) an amount of an organotitanium compound sufficient to increase the cure rate of said composition relative to the rate achieved in the absence of said compound.

The Organotitanium Compound (Ingredient D)

The inventive feature considered responsible for the increased cure rate of the present curable organosiloxane compositions is the presence of an organotitanium compound, referred to hereinafter as ingredient D. The organotitanium compound can be any of those known to be effective in catalyzing the moisture initiated reaction of alkoxy, containing siloxanes or silanes with silanol groups. Organotitanium compounds suitable for use in the present compositions include but are not limited to titanic acid esters such as tetrabutyltitanate, and betadicarbonyl titanium compounds such as those described in U.S. Pat. No. 3,334,067, which is incorporated by reference to show titanium-containing catalysts and methods for their preparation. Preferred titanium compounds include but are not limited to tetrabutyltitanate, tetraisopropyltitanate and bis-(acetoacetonyl) dialkyltitantes.

The concentration of ingredient D is at least about 0.01 to about 1 weight percent, based on the weight of the curable composition. The cure rate of the composition is not substantially increased at concentrations below about 0.01 parts by weight of preferred organotitanium compounds. This limit may be slightly higher or lower depending upon the particular organotitanium compound selected. The concentration of ingredient D is preferably from 0.04 to about 1 weight percent. Concentrations greater than about one weight percent may interfere with the curing reaction, resulting in a reduction in cure rate and/or the physical properties of the cured material.

The Alkenyl-Containing Organopolysiloxane (Ingredient A)

The organopolysiloxane referred to as ingredient A of the present compositions is the principal ingredient of these compositions. This ingredient must contain at least two silicon-bonded alkenyl radicals in each molecule. Suitable alkenyl radicals contain from 2 to about 10 carbon atoms and are exemplified by but not limited to vinyl, allyl and 5-hexenyl. The silicon-bonded organic groups other than alkenyl radicals present in ingredient A are typically monovalent hydrocarbon and halogenated hydrocarbon radicals exemplified by but not limited to alkyl radicals such as methyl, ethyl and propyl; aryl radicals such as phenyl; and halogenated alkyl radicals such as 3,3,3-trifluoropropyl.

The molecular structure of ingredient A is typically linear, however there can be some branching due to the presence of trivalent siloxane units within the molecule. To achieve a useful level of tensile properties in the elastomers prepared by curing the present compositions, the molecular weight of this ingredient should be sufficient to achieve a viscosity at 25° C. greater than about 0.1 Pa.s. The upper limit for the molecular weight of ingredient A is not specifically restricted, and is typically limited only by the processability of the curable organosiloxane composition. The organopolysiloxanes range from pourable liquids to gum type polymers.

Preferred embodiments of ingredient A can be represented by the general formula I

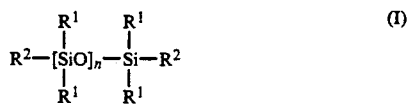

where each $R^1$ is individually selected from monovalent hydrocarbon radicals and monovalent halohydrocarbon radicals, $R^2$ represents a vinyl or other terminally unsaturated hydrocarbon radical, and n represents a degree of polymerization equivalent to a viscosity of at least one million centipoise.

The two $R^1$ substituents on each silicon atom can be identical or different, and can contain from 1 to about 20 carbon atoms. A range of from 1 to 10 carbon atoms is preferred based on the availability of the corresponding monomers. Most preferably at least 50 percent of hydrocarbon radicals represented by $R^1$ are methyl, and any remainder are vinyl, phenyl and/or 3,3,3-trifluoropropyl, this preference being based on the availability of the reactants typically used to prepare the polydiorganosiloxane and the properties of cured elastomers prepared from these polydiorganosiloxanes.

Representative embodiments of ingredient A containing ethylenically unsaturated hydrocarbon radicals only at the terminal positions include but are not limited to dimethylvinylsiloxy-terminated polydimethylsiloxanes, dimethylvinylsiloxy-terminated-polymethyl-3,3,3-trifluoropropylsiloxanes, dimethylvinylsiloxy-terminated -dimethylsiloxane/3,3,3-trifluoropropylmethylsiloxane copolymers and dimethylvinylsiloxy-terminated-dimethylsiloxane/methylphenylsiloxane copolymers.

Methods for preparing ingredient A of the present compositions by hydrolysis and condensation of the corresponding halosilanes or by condensation of the cyclic polydiorganosiloxanes are sufficiently disclosed in the patent and other literature that a detailed description in this specification is not necessary.

For applications requiring high levels of physical properties such as tear strength it may be desirable to include in the curable organosiloxane composition a second diorganopolysiloxane containing ethylenically unsaturated hydrocarbon radicals bonded to non-terminal silicon atoms.

The Organohydrogenpolysiloxane (Ingredient B)

At least one organohydrogenpolysiloxane functions as the crosslinker in the curable organosiloxane compositions of the present invention. In the presence of the microencapsulated hydrosilation catalyst, referred to as ingredient C, the silicon-bonded hydrogen atoms in ingredient B undergo an addition reaction, referred to as hydrosilation, with the silicon-bonded alkenyl groups in ingredient A, resulting in crosslinking and curing of the composition.

Ingredient B must contain at least 2 silicon-bonded hydrogen atoms in each molecule. If ingredient A contains only two alkenyl radicals per molecule, ingredient B must contain an average of more than two silicon-bonded hydrogen atoms to achieve a crosslinked structure in the final cured product. The silicon-bonded organic groups present in ingredient B are selected from the same group of monovalent hydrocarbon and halogenated hydrocarbon radicals as the organic groups of ingredient A, with the proviso that the organic groups in ingredient B must be substantially free of ethylenic or acetylenic unsaturation. The molecular structure of ingredient B can be straight chain, branch-containing straight chain, cyclic, or network.

While the molecular weight of ingredient B is not specifically restricted, viscosities in the range of 3 to 10,000 centipoise at 25 degrees Centigrade are preferred.

The concentration of ingredient B is sufficient to provide a molar ratio of silicon-bonded hydrogen atoms to alkenyl radicals in the curable composition of from 0.5 to 20. A range of from 1 to 3 is preferred.

When the curable composition contains less than 0.5 moles of silicon-bonded hydrogen atoms per mole of alkenyl radicals the composition cannot be satisfactorily cured. Bubble formation resulting from the generation of hydrogen gas can occur when the composition contains more than about 20 silicon-bonded hydrogen atoms per alkenyl radical.

The Microencapsulated Platinum-Containing Hydrosilation Catalyst (Ingredient C)

Curing of the present compositions is catalyzed by a microencapsulated hydrosilation catalyst in combination with the organotitanium compounds.

The ability of organotitanium compounds to accelerate curing of the composition is unique to microencapsulated hydrosilation catalysts. Data in the accompanying examples demonstrate that the presence of an organotitanium compound actually retards curing of compositions containing conventional hydrosilation catalysts that have not been microencapsulated.

The hydrosilation or curing catalyst portion of ingredient C is a metal from the platinum group of the periodic table or a compound of such a metal. These metals include platinum, palladium and rhodium. Platinum and platinum compounds are preferred based on the high activity level of these catalysts in hydrosilation reactions.

Examples of preferred curing catalysts include but are not limited to platinum black, platinum metal on various solid supports, chloroplatinic acid, alcohol solutions of chloroplatinic acid, and complexes of chloroplatinic acid with liquid ethylenically unsaturated compounds such as olefins and organosiloxanes containing ethylenically unsaturated hydrocarbon radicals bonded to silicon. Complexes of chloroplatinic acid with the aforementioned organosiloxanes containing ethylenically unsaturated hydrocarbon radicals are described in U.S. Pat. No. 3,419,593, which issued to David N. Willing on Dec. 31, 1968. The relevant portions of this patent are incorporated herein by reference as a teaching of preferred catalysts.

The concentration of ingredient C in the present compositions is equivalent to a platinum concentration of from 0.1 to 500 parts by weight of platinum metal, preferably from 1 to 50 parts by weight of platinum metal, per million parts (ppm), based on the combined weight of ingredients A and B.

Curing does not proceed satisfactorily at below 0.1 ppm of platinum, while using more than 500 ppm results in no appreciable increase in cure rate, and is therefore uneconomical.

Any of the known microencapsulated platinum group metal containing hydrosilation catalysts can be used in combination with the organotitanium compound.

Encapsulating materials for ingredient C are typically selected from thermoplastic organic polymers, organosiloxane homopolymers and copolymers and organopolysilanes. These polymers exhibit a softening point or glass transition temperature of from 50° to 200° C. Depending upon the method used to liberate the catalyst, the encapsulating material can be a thermosetting material such as an epoxide or a phenol/formaldehyde resin.

One embodiment of ingredient C contains the hydrosilation catalyst as a core within a shell or skin formed from at least one layer of encapsulating material. In a second embodiment the hydrosilation-reaction catalyst is dissolved or dispersed throughout the encapsulating material.

The encapsulating polymer portion of ingredient C can be any polymer that is essentially impermeable to the hydrosilation-reaction catalyst at least during the period of storage and is essentially insoluble in the organopolysiloxane referred to as ingredient A.

Thermoplastic polymers which can be used to encapsulate the hydrosilation catalyst include but are not limited to acrylic polymers, polystyrene, methyl cellulose, organopolysiloxanes and organopolysilanes.

The hydrosilation catalyst can be encapsulated within a microparticulate polymer using any of the known methods. These methods include but are not limited to chemical methods such as interfacial polymerization and in-situ polymerization, physical-chemical methods such as coacervation, and physical-mechanical methods such as spray drying. Of these methods spray drying is preferred because it will yield microparticles with a narrow particle size distribution in a relatively simple and straightforward manner.

The microparticles of catalyst-containing thermoplastic resin obtained using any of the methods described in the preceding paragraph can be used directly as ingredient C. If it is desired achieve a superior level of storage stability for the curable composition, it is preferable to wash the particles of encapsulated catalyst with an appropriate washing solvent in order to remove any catalyst adhering to the surface of the resin particles. Suitable washing solvents should not dissolve the thermoplastic resin, but should be capable of dissolving the hydrosilation catalyst. Examples of suitable washing solvents include but are not limited to alcohols such as methyl alcohol and ethyl alcohol and low-molecular-weight organopolysiloxanes such as hexamethyldisiloxane.

The average particle size for the encapsulated catalyst should be within the range of from 0.01 to 100 micrometers, preferably within the range of from 0.1 to 10 micrometers. When the average particle size falls below 0.01 micrometers, there is a drastic decline in the yield of hydrosilation catalyst obtained using known methods. When the average particle size exceeds 100 micrometers, the stability of the dispersed catalyst-containing microparticulate resin in the organopolysiloxane referred to as ingredient A of the present compositions is impaired.

Optional Additives

The curable organosiloxane compositions of this invention can contain one or more of various additives. The effect of these additives can range from reducing the viscosity of the curable composition to improving the mechanical strength of moldings prepared from the composition. Typical additives include but are not limited to reinforcing fillers such as precipitated silica, fumed silica, calcined silica, and fumed titanium oxide; non-reinforcing fillers such as quartz powder, diatomite, asbestos, aluminosilicic acid, iron oxide, zinc oxide, and calcium carbonate. The surfaces of any of these fillers can be treated with an organosilicon compound such as organosilanes and low molecular weight organopolysiloxanes. The compositions can also contain any of the organosiloxane resins known to be effective reinforcing agents for organosiloxane elastomers.

So long as the objectives of the present invention are not comprised, the curable organopolysiloxane composition of the present invention may contain small or very small quantities of one or more additives for inhibiting the curing reaction, such as acetylenic compounds, hydrazines, triazoles, phosphines, or mercaptans. It has been found that the storage stability of one-part curable compositions containing an encapsulated hydrosilation catalyst is further improved and the cure rate of the compositions accelerated when the compositions contain one of these cure-inhibiting additives. Acetylenic alcohols are a preferred class of platinum catalyst inhibitors for use with microencapsulated platinum-containing hydrosilation catalysts.

One or more of the following additives can be present to impart desirable properties to the cured elastomer: pigments, heat stabilizers, flame retardants, internal release agents, plasticizers, and non-reactive silicone oils.

Preparation of Curable Compositions

The curable compositions of the present invention can be easily and simply prepared by blending ingredients A through D together with any optional additives to homogeneity using any of the known mixing/kneading means, which include but are not limited to two roll mills, blade type mixers and kneader mixers.

Care should be taken during processing of the composition not to crush the particles of encapsulated hydrosilation catalyst, resulting in exposure of the catalyst and premature curing of the composition.

The following examples describe preferred embodiments of the curable organosiloxane compositions of this invention, and should not be interpreted as limiting the scope of the invention as defined in the accompanying claims. Unless otherwise specified all parts and percentages are by weight and viscosity and Williams plasticity values were measured at 25° C.

EXAMPLE 1

An organosiloxane composition identified hereinafter as composition I was prepared by blending the following ingredients to homogeneity in a dough-type mixer:

68 parts of a dimethylvinylsiloxy-terminated polydimethylsiloxane gum containing 0.142 mole percent of methylvinylsiloxane units and exhibiting a Williams plasticity of from 1.4 to 1.7 mm.

1 part of a hydroxyl-terminated dimethylsiloxane/-methylvinylsiloxane copolymer containing about 10 weight percent of vinyl radicals and about 16 weight percent of hydroxyl groups, 5 parts of a hydroxyl terminated polymethylphenylsiloxane having a viscosity of about 0.5 Pa.s at 25° C. and a hydroxyl content of about 4.5 weight percent, 25 parts of a fume silica having a nominal surface area of 250 m² per gram, and 0.02 part of ammonia gas.

Curable compositions (II) of this invention were prepared by blending resultant organosiloxane composition I with the following ingredients at 25° C.:

as the organohydrogensiloxane curing agent, 1 part per 100 parts of organosiloxane composition I of an organosiloxane copolymer corresponding to the average formula $(Me_3SiO_{\frac{1}{2}})_{12.7}(Me_2SiO)_{29.1}(MeHSiO)_{54.6}(MeSiO_{3/2})_{3.6}$ where Me represents methyl, equivalent to a molar ratio of silicon-bonded hydrogen atoms to vinyl radicals in the composition of 1.8;

an amount of a microencapsulated platinum-containing hydrosilation catalyst equivalent to 3 ppm. of platinum, based on the weight of the curable composition;

300 ppm, based on the total weight of the curable composition, of 1-ethynylcyclohexanol, and the amount of 2,5-di-isopropoxy-bis(ethylacetoacetanoyl)titanium (TDIDE) or tetrabutyl titanate listed in Table 1.

The platinum-containing catalyst was a reaction product of hexachloroplatinic acid and sym-tetramethyldivinyldisiloxane that had been diluted with isopropanol and water to achieve a platinum content of 5 weight percent. The catalyst was microencapsulated in an organosiloxane copolymer of the average formula $(Me_2SiO)_{0.22}(PhSiO_{1.5})_{0.78}$ and the resultant microcapsules were diluted with a mixture containing 65 weight percent of a dimethylvinylsiloxy terminated polydimethylsiloxane having a viscosity of about 2.1 Pa.s at 25 degrees C. and 35 weight percent of a trimethylated reinforcing silica.

For comparative purposes a composition containing all of the foregoing ingredients with the exception of the microencapsulated hydrosilation catalyst was also prepared. This composition contained 0.2 weight percent of TDIDE. A second comparative composition omitted only the titanium compound.

The curable compositions were placed in a rheometer and cured by heating them at 150° C. The time required to achieve 90 percent of the maximum torque value is recorded in Table 1 under the heading "$T_{90}$".

Additional samples of each curable composition II were heated for 10 minutes in a press maintained at a temperature of 150° C. Test samples for the various physical property measurements were obtained from the resultant sheets of cured elastomer.

To determine the resistance of the elastomers to heat-induced degradation, samples of each cured elastomer were heated for 72 hours at 225° C., at which time the physical properties were again measured. The results of all physical property measurements are recorded in Table 2. The relative changes, in percent, exhibited by the properties during heat treatment are listed under the heading "% HT" in Table 2. The changes in durometer hardness are actual rather than relative, and the percent sign (%) is therefore omitted.

TABLE 1

Ingredients and Cure Rate of Compositions

| Composition | Titanium Compound Type | Wt. % | $T_{90}$ (minutes) |
|---|---|---|---|
| 1C | None | 0 | 10 |
| 2 | TDIDE | 0.04 | 8.7 |
| 3 | TDIDE | 0.2 | 6.0 |
| 4 | TDIDE | 0.5 | 5.4 |
| 5C* | TDIDE | 0.2 | no curing |
| 6 | TBT | 0.2 | 6.6 |

Examples 1C and 5C are for comparative purposes
* = No platinum catalyst present
TBT = Tetrabutyltitanate
TDIDE = 2,5-di-isopropoxy-bis(ethylacetoacetanoyl)titanium

TABLE 2

| Sample | Durometer Hardness Shore A Initial | HT | Tensile Strength MPa Initial | % HT | Elongation % Initial | % HT |
|---|---|---|---|---|---|---|
| 1C | 53 | 56 | 8.6 | −35 | 371 | −36 |
| 2 | 54 | 57 | 8.4 | −25 | 376 | −33 |
| 3 | 55 | 60 | 7.6 | −27 | 387 | −28 |
| 4 | 54 | 59 | 8.1 | −28 | 388 | −26 |
| 5C | Did Not Cure | | | | | |
| 6 | 55 | 57 | 7.9 | −30 | 352 | −29 |

EXAMPLE 2

This example demonstrates the absence of any increase in cure rate when the organotitanium compounds of this invention are used in a peroxide-curable organosiloxane composition.

The peroxide curable organosiloxane compositions were prepared by blending composition I of example 1 with 1 weight percent of either 2,5-bis(tert-butylperoxy)-2,5-dimethylhexane (P1) or 2,4-dichlorobenzoyl peroxide (P2) in addition to the type and amount of organotitanium compound indicated in Table 3. The peroxides were used in the form of pastes containing 50% of the active ingredient. The samples containing P1 were cured by heating them for 10 minutes at 340° C. and the samples containing P2 were cured by heating for 5 minutes at 240° C.

The cure times ($T_{90}$) of the resultant curable compositions were measured as described in example 1, and the results are recorded in Table 3.

TABLE 3

| Sample | Peroxide | Organotitanium Compound Type | Wt. % | $T_{90}$ (minutes) |
|---|---|---|---|---|
| 7C | P1 | None | 0 | 7.5 |
| 8C | P1 | TDIDE | 0.2 | 7.7 |
| 9C | P1 | TDIDE | 0.5 | 7.7 |
| 10C | P1 | TBT | 0.2 | 7.5 |
| 11C | P1 | TBT | 0.5 | 8.1 |
| 12C | P2 | None | 0 | 3.8 |
| 13C | P2 | TDIDE | 0.2 | 3.9 |
| 14C | P2 | TDIDE | 0.5 | 3.9 |
| 15C | P2 | TBT | 0.2 | 3.9 |
| 16C | P2 | TBT | 0.5 | 3.9 |

None of the compositions containing an organotitanate compound in combination with the peroxide exhibited an increase in cure rate relative to a composition containing only the peroxide.

EXAMPLE 3

This example demonstrates the absence of any cure accelerating effect by the present titanium compounds in organosiloxane compositions that cure using a hydrosilation reaction catalyzed by a non-encapsulated platinum compound.

Curable organosiloxane compositions outside the scope of the present invention were prepared by blending the following ingredients to homogeneity:

87 parts of a liquid dimethylvinylsiloxy terminated polydimethylsiloxane exhibiting a viscosity of about 3 Pa.s 43 parts of a dimethylvinylsiloxy terminated polydimethylsiloxane exhibiting a viscosity of 2 Pa.s 1.2 part of a hydroxyl-terminated dimethylsiloxane/methylvinylsiloxane copolymer containing about 10 weight percent of vinyl radicals and about 16 weight percent of hydroxyl groups 2.5 parts of water 10 parts of hexamethyldisilazane 50 parts of a fume silica having a nominal surface area of 250 m² per gram 2 parts of a hydroxyl terminated terminated polydimethylsiloxane fluid having a viscosity of about 0.04 Pa.s at 25° C. and containing 4 weight percent silicon-bonded hydroxyl radicals 0.19 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent, 0.05 part of 2-methyl-3-butyn-2-ol, and the quantity of tetrabutyl titanate (TBT) or 2,5-di-isopropoxy-bis(ethylacetoacetanoyl)titanium (TDIDE) specified in Table 4.

The compositions were cured in a Monsanto rheometer operating at a temperature of 150° C. The time required to achieve 90 percent of the maximum torque value is recorded in Table 1 under the heading "T$_{90}$".

TABLE 4

| % TBT | % TDIDE | T$_{90}$ (min) |
|---|---|---|
| 0 | 0 | 0.87 |
| 0 | 0.04 | 1.14 |
| 0 | 0.2 | 1.48 |
| 0.04 | 0 | 1.3 |
| 0.2 | 0 | 1.6 |

The data in Table 4 demonstrates that the time required to cure actually increased with increasing concentration of the titanium compound. This is the reverse of what was observed using an encapsulated platinum-containing hydrosilation catalyst.

EXAMPLE 4

This example demonstrates the effect of cure temperature on the acceleration in cure rate imparted by the present organotitanium compounds to high consistency organosiloxane compositions containing an encapsulated platinum catalyst.

Curable compositions were prepared and cured using the ingredients and procedures described in Example 1. The only difference was that the temperature of the rheometer was 170° C. rather than 150° C. The values for T90 are recorded in Table 5 and the physical properties of the cured materials are recorded in Table 6.

TABLE 5

| Ingredients and Cure Rate of Compositions | | | |
|---|---|---|---|
| | Titanium Compound | | T$_{90}$ |
| Sample No. | Type | Wt. % | (minutes @ 170° C.) |
| 17C | None | 0 | 10.5 |
| 18 | TDIDE | 0.04 | 7.55 |
| 19 | TDIDE | 0.2 | 4.15 |
| 20 | TBT | 0.04 | 7.7 |
| 21 | TBT | 0.2 | 5.34 |

The relative changes, in percent, exhibited by the properties during heat treatment are listed under the heading "% HT" in Table 2. The changes in durometer hardness are actual rather than relative, and the percent sign (%) is therefore omitted.

TABLE 6

| | Durometer Hardness Shore A | | Tensile Strength MPa | | Elongation % | |
|---|---|---|---|---|---|---|
| Sample | Initial | HT | Initial | % HT | Initial | % HT |
| 17C | 56 | 59 | 9.1 | −48 | 386 | −44 |
| 18 | 56 | 60 | 8.9 | −34 | 383 | −36 |
| 19 | 56 | 62 | 8.9 | −33 | 396 | −30 |
| 20 | 55 | 62 | 8.7 | −41 | 370 | −42 |
| 21 | 56 | 62 | 9.0 | −28 | 379 | −30 |

The data in Table 5 demonstrate that the acceleration in cure rate provided by the organotitanium compound increases with increasing temperature. By comparison, there is actually a slight decrease in cure rate in the absence of the organotitanium compound when the cure temperature is increased from 150° to 170° C.

That which is claimed is:

1. In a curable organosiloxane composition comprising
   A) an organopolysiloxane containing an average of at least two terminally unsaturated hydrocarbon radicals per molecule,
   B) an amount of an organohydrogenpolysiloxane sufficient to cure said organopolysiloxane to an elastomer in the presence of a hydrosilation catalyst, and
   C) an amount of a microencapsulated platinum-containing hydrosilation catalyst sufficient to promote curing of said composition, the improvement comprising the presence in said composition of
   D) an amount of an organotitanium compound sufficient to increase the cure rate of said composition relative to the rate achieved in the absence of said compound, where the organotitanium compound is selected from the group consisting of titanic acid esters and betadicarbonyltitanium compounds.

2. A composition according to claim 1 where the concentration of organotitanium compound is at least 0.01 weight percent, based on the weight of said composition, the organic groups on said organopolysiloxane and said organohydrogenpolysiloxane are selected from the group consisting of monovalent unsubstituted and substituted hydrocarbon radicals containing from 1 to 20 carbon atoms, with the proviso that the hydrocarbon radicals present on said organohydrogenpolysiloxane are substantially free of ethylenic and acetylenic unsaturation, and said hydrosilation catalyst is encapsulated within at least one layer of a thermoplastic organic polymer or a thermoplastic polyorganosiloxane.

3. A composition according to claim 2 where the organotitanium compound is tetrabutyltitanate, tetraisopropyltitanate or bis(ethylacetoacetonyl)diisopropyltitanate, the organopolysiloxane is a liquid or high consistency diorganopolysiloxane exhibiting the average formula

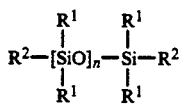

where each $R^1$ is individually selected from monovalent hydrocarbon radicals and monovalent halohydrocarbon radicals, $R^2$ represents an ethylenically unsaturated hydrocarbon radical, and n represents a degree of polymerization equivalent to a viscosity of at least 0.1 Pa.s at 25° C., the hydrosilation catalyst is a complex of chloroplatinic acid with an organosiloxane containing ethylenically unsaturated hydrocarbon radicals, and the molar ratio of silicon-bonded hydrogen atoms to ethylenically unsaturated hydrocarbon radicals in said composition is from 1 to 3, inclusive.

4. A composition according to claim 3 where at least 50 percent of the hydrocarbon radicals present in the diorganopolysiloxane and the organohydrogenpolysiloxane are methyl, and any remainder other than the ethylenically unsaturated hydrocarbon radicals present in said diorganopolysiloxane are selected from the group consisting of phenyl and 3,3,3-trifluoropropyl the ethylenically unsaturated hydrocarbon radicals present in said diorganopolysiloxane are selected from the group consisting of vinyl, allyl and 5-hexenyl, and said polymer is a polyorganosiloxane.

5. A composition according to claim 4 where the average particle size of said microencapsulated hydrosilation catalyst is from 0.1 to 10 microns and said composition contains an acetylenic alcohol as a platinum catalyst inhibitor.

* * * * *